United States Patent
Bertoni et al.

(10) Patent No.: US 8,117,251 B2
(45) Date of Patent: Feb. 14, 2012

(54) COMPUTATION OF A MULTIPLICATION OPERATION WITH AN ELECTRONIC CIRCUIT AND METHOD

(75) Inventors: Guido Marco Bertoni, Canate (IT); Pasqualina Fragneto, Milan (IT); Andrew Richard Marsh, Bristol (GB); Gerardo Pelosi, Matera (IT); Moris Ravasio, Bottanuco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1294 days.

(21) Appl. No.: 11/786,767

(22) Filed: Apr. 11, 2007

(65) Prior Publication Data
US 2007/0260664 A1 Nov. 8, 2007

(30) Foreign Application Priority Data
Apr. 11, 2006 (EP) ..................... 06112507

(51) Int. Cl.
*G06F 7/38* (2006.01)
(52) U.S. Cl. ........................ 708/490; 708/203
(58) Field of Classification Search .................. 708/490, 708/203
See application file for complete search history.

(56) References Cited

FOREIGN PATENT DOCUMENTS
EP 1650727 A 4/2006
WO WO 2005/013243 A 2/2005

OTHER PUBLICATIONS

Set-Top Boxes, 2000-2011, itvdictionary.com, pp. 1-7.*
European Patent Office, European Search Report, Jun. 21, 2006, Application No. EP 06 11 2507.
Chiou, C.W., et al., "Iterative modular multiplication algorithm without magnitude comparison," Electronic Letters, Nov. 24, 1994, pp. 2017-2018, vol. 30, No. 24.
Koc, C.K., et al., "Carry-Save Adder for Computing the Product AB Modulo N," Electronic Letters, Jun. 21, 1990, pp. 899-900, vol. 26, No. 13.
Nibouche, O., et al., "New iterative algorithms for modular multiplication," Signal Processing, Oct. 2004, pp. 1919-1930, vol. 84, No. 10, Elsevier Science Publishers, Amsterdam, NL.
Batina, L., et al., "Hardware architectures for public key cryptography," Integration, The VLSI Journal, May 2003, pp. 1-64, vol. 34, No. 1-2, North-Holland Publishing Company, Amsterdam, NL.

* cited by examiner

*Primary Examiner* — Lewis Bullock, Jr.
*Assistant Examiner* — Kevin G Hughes
(74) *Attorney, Agent, or Firm* — Lisa K. Jorgenson; Kevin D. Jablonski; Graybeal Jackson LLP

(57) ABSTRACT

A computing method and circuit for computing a modular operation with at least one operand having a binary representation. Iteratively for each bit of this operand, doubling the value of an intermediate result stored in a first memory element by shifting the bits of the intermediate result towards the most significant bit and, while the most significant bit of the intermediate result is one, updating this intermediate result by subtracting a modulus stored in a second memory element.

10 Claims, 7 Drawing Sheets

COMPUTATION OF A MULTIPLICATION OPERATION WITH AN ELECTRONIC CIRCUIT AND METHOD

PRIORITY CLAIM

This application claims priority from European patent application No. 06112507.6, filed Apr. 11, 2006, which is incorporated herein by reference.

TECHNICAL FIELD

The present disclosure relates to the field of electronic circuits and more particularly to a method and circuit for computing a multiplication operation.

BACKGROUND

FIG. 1 schematically illustrates a set top box including a video processor integrated circuit 1 (STB) having Set Top Box and decoder functions. Circuit 1 can receive digital terrestrial (antenna 2), satellite (antenna 3) or cable 4 broadcasted signals from receiving interfaces 12, 13, 14 (RX) respectively. Circuit 1 can also be coupled to a DVD interface 15 (DVD IF) to process digital video signals from a DVD 5 or to any other video interface. Circuit 1 processes (for example, demultiplexes, decrypts, decodes, etc.) video streams with associated audio channels. Video is outputted to adapted displays (for example a TV monitor 6) or recorders (for example a video cassette recorder 7 (VCR)). Circuit 1 also usually comprises composite outputs and audio outputs (not shown). Various interfaces, memories 16 and other storage means (for example mass storage elements like a Hard Disk Drive 17 (HDD)) can be embedded in a same device 1' with the circuit 1. FIG. 1 is an example and alternative or additional functionality can be provided.

Internally, circuit 1 comprises the required functions (software and/or hardware implemented) for processing the appropriate signals. Among others, circuit 1 usually comprises a central processing unit 18 (CPU), internal storage elements 16, (MEM) such as RAM and/or registers, and hardware computation unit 19 (HWFCT). Among the functions of circuit 1, the disclosure more particularly relates to the computation of cryptographic operations.

Cryptographic operations usually process big digital numbers (several hundreds or thousands of bits) and are time consuming. Simplification methods are usually implemented to save time and/or space. In many cryptosystems, operations are executed modulo a prime number or the product of two primes. A known method for computing modular multiplication and squaring uses the so-called Montgomery multiplication method. Modular squares are required, for example, during an exponentiation computation by the method called square and double.

A Montgomery multiplication, noted MM(A, B, n), of a first operand A by a second operand B, both lower than n computes $A*B*R^{-1}$ (mod n), with R and n such that gcd(n, R)=1 and n is odd (not divisible by two), where "mod" designates "modulo" and "gcd" designates "greatest common divider". The Montgomery algorithm requires the operands to be expressed in the Montgomery domain (residual representation) noted $[X]_n$ for an integer X comprised in the interval [0, n]. Obtaining the residual representation of an integer X requires a transformation which corresponds to a computation of $[X]_n$ such that $[X]_n = MM(X, R^2, n) = X*R^2*R^{-1}$ (mod n). Hence, a Montgomery multiplication requires a pre-computation of a parameter $R^2$(mod n). Parameter $R^2$(mod n) can be computed as $R^2$(mod n)=[R(mod n)*R](mod n).

FIG. 2 is a block diagram illustrating a known example of implementation of a computation of value $R^2$(mod n).

A variable Z containing the intermediate result of the computation is initialized (block 21) with value R−n. Then, an iterative loop is implemented for each of the k bits of the binary representation of n. For example, an index i is initialized with value 1 (block 21) and a loop computation is performed for each bit of n, until the $k^{th}$ bit (included). In each iteration of the loop (output N of block 22, i=k+1 ?), variable Z is first doubled (block 23, Z=2*Z). Then, variable Z is compared to n (block 24, Z>n ?). While Z>n (output Y of block 24), variable Z is reduced by n (block 25, Z=Z−n). When Z is lower than modulus n (output N of block 24), the index i is incremented (block 26, i=i+1) for the next iteration. When the k iterations have been processed (output Y of block 22), the variable Z contains the result ($R^2$(mod n)).

The pre-computation of the parameter $R^2$(mod n) depends (at least indirectly) on the operands of the algorithm (for example on a public key of a cryptographic algorithm).

A Montgomery multiplication can be used, for example, to check a digital signature of a boot code of an embedded device. When the device has to boot, it first loads the public key of the user from an external memory. This key is signed with an internal stored public key of the manufacturer of the circuit and compared to an embedded signature before allowing the circuit to boot. The verified user public key is then used to check the authenticity of the boot code. In such an application, the computation time is critical since the device can not boot until the signature(s) has/have been checked.

The number of potential R values to be processed by a cryptosystem becomes higher and higher. Further, memory space limitations do not usually allow (especially in integrated circuits) the storage of a big number of pre-computed parameters. Furthermore, such a pre-computation may be undesirable for privacy reasons.

Hence, there is a need to increase the speed for computing a parameter such as $R^2$(mod n).

SUMMARY

Embodiments of the present disclosure concern the computation of modular multiplications or modular reductions, for example for a Montgomery type multiplication.

An example of an application of embodiments of the present disclosure is an electronic circuit implementing cryptographic functions in connection with video processing. Such a circuit can be present in a Set Top Box or the like.

More generally, embodiments of the present disclosure apply to any cryptosystem, especially implemented in an integrated circuit, for the computation of a modular multiplication or reduction. Many cryptosystems, such as RSA, Diffie-Hellman, ECC and HECC require operations modulo a prime number or the product of two primes. Embodiments of the disclosure can apply to any of these cryptosystems.

Embodiments of the present disclosure more specifically aim at providing a method and circuit for computing a modular multiplication or reduction of an integer, providing a method and circuit especially suitable for pre-computing a modular square, and providing a solution adapted for Montgomery multiplication.

According to an embodiment of the present disclosure, a method for computing a modular operation with at least one operand having a binary representation, at least including iteratively for each bit of this operand doubling the value of an intermediate result stored in a first memory element by shifting the bits of the intermediate result towards the most significant bit.

While the most significant bit of the intermediate result is one, this intermediate result is updated by subtracting the modulus stored in a second memory element.

According to an embodiment of the present disclosure, a method for computing of a modular operation with at least one operand represented by several words of a fixed number of bits, at least including iteratively for each word of this operand multiplying the value of an intermediate result stored in a first memory element by two to the power of the number of bits, by shifting the bits of the intermediate result towards the most significant bit a number of times corresponding to the number of bits per word. While the most significant word of the intermediate result does not have a zero value, this intermediate result is updated by subtracting the modulus stored in a second memory element a number of times representing the value of the most significant word.

According to an embodiment of the present disclosure, a method further comprises a last step of updating the intermediate result by subtracting the modulus if the current value of the intermediate result at the end of the iterations is greater than the value of the modulus.

According to an embodiment of the present disclosure, the intermediate result is initialized with a value depending on the operand.

According to an embodiment of the present disclosure, the operation is a modular square of an integer representing the operand, the intermediate result being initialized with the operand minus the modulus, the intermediate result representing the final result of the modular operation.

According to an embodiment of the present disclosure, the method is applied to compute a square parameter of a Montgomery multiplication.

According to an embodiment of the present disclosure, the operation is a modular multiplication of a first operand by a second operand, the iterative steps being performed for each bit or word of the second operand.

According to an embodiment of the present disclosure, the intermediate result is initialized with zero, the method including, before the doubling operation and if the state of the current bit of the second operand is one, updating the intermediate result by adding the first operand, the intermediate result representing the final result of the modular operation.

According to an embodiment of the present disclosure, the intermediate result represents a first intermediate result initialized with the value of the first operand, a second intermediate result being initialized with zero, the method including, for each bit of the second operand before the doubling operation and if the state of the current bit of the second operand is one, updating the second intermediate result by adding the first intermediate result. The conditional subtracting steps are performed a first time based on the first intermediate result. The conditional subtracting steps are performed a second time based on the second intermediate result, the second intermediate result representing the final result.

According to an embodiment of the present disclosure, the operation is a modular reduction, the intermediate result representing a first intermediate result initialized with a value representing two to the power of k reduced by the modulus, where k designates the number of bits representing the modulus, a second intermediate result being initialized with the k lowest significant bits of the operand, the method including, for each bit of the operand before the doubling operation and if the state of the current bit of the second operand is one, updating the second intermediate result by adding the first intermediate result. The conditional subtracting steps are performed a first time based on the first intermediate result. The conditional subtracting steps are performed a second time based on the second intermediate result, the second intermediate result representing the final result of the modular operation.

Embodiments of the present disclosure also provide an integrated circuit for performing a modular operation including a computation core receiving a first value and a second value representing the modulus, and providing an updated first value, the core including a shifter unit, a subtracting unit, a selecting unit, and a control unit to perform the iterative steps of the computation.

According to an embodiment of the present disclosure, the circuit is integrated in a processing unit of cryptographic algorithms and in another embodiment this processing unit is contained in a Set Top Box.

BRIEF DESCRIPTION OF THE DRAWINGS

The foregoing and other purposes, features, aspects and advantages of the disclosure will become apparent from the following detailed description of a number of embodiments, which is given by way of illustration only without limiting the disclosure, and throughout which reference is made to the accompanying drawings in which.

The same elements have been designated with the same numerals in the different figures. For reasons of clarity, only steps and elements which are useful for the understanding of the present disclosure have been shown and will be described. In particular the uses of the results computed by the disclosure have not been detailed, the disclosure being compatible with any conventional use of such results. Further, the destination of the computation made by the disclosure (cryptographic function, decoding, etc.) has also not been detailed, the disclosure also being compatible with any destination of the computation.

DETAILED DESCRIPTION

The following discussion is presented to enable a person skilled in the art to make and use the disclosure. Various modifications to the embodiments will be readily apparent to those skilled in the art, and the generic principles herein may be applied to other embodiments and applications without departing from the spirit and scope of the present disclosure.

Thus, the present disclosure is not intended to be limited to the embodiments shown, but is to be accorded the widest scope consistent with the principles and features disclosed herein.

Embodiments of the disclosure originate in analyses of the time consuming operations in a Montgomery multiplication or the like. The modular reduction part performed as division or as sequence of full length comparison (Z with respect to n) is highly time consuming.

Figure 2:
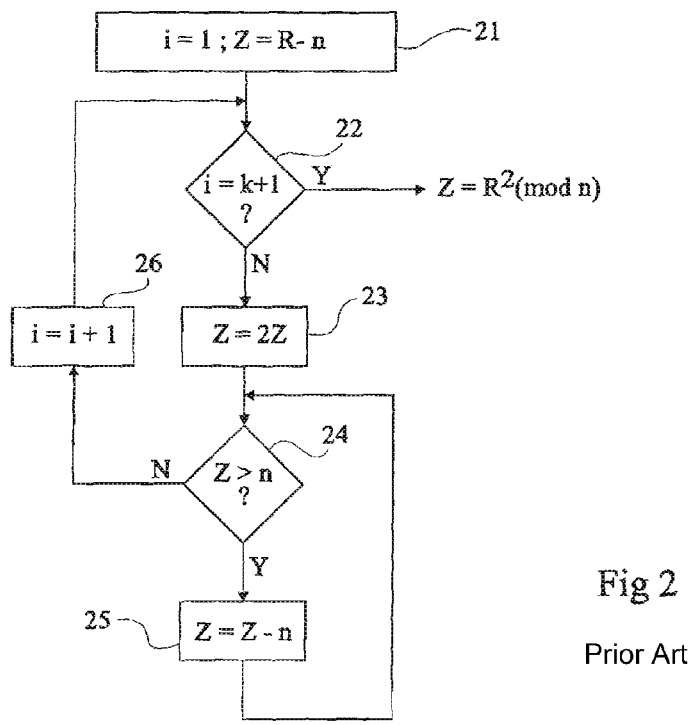
FIG. 2 (already described) illustrates a conventional computation of a modular square for a Montgomery algorithm.

A feature of an embodiment of the present disclosure is to replace the conventional iterative comparison step (24, FIG. 2) of the whole variable of a computation either by a single bit test or by a word (multiple bits) test on a number of bits less than the number of bits of the variable.

Figure 3:
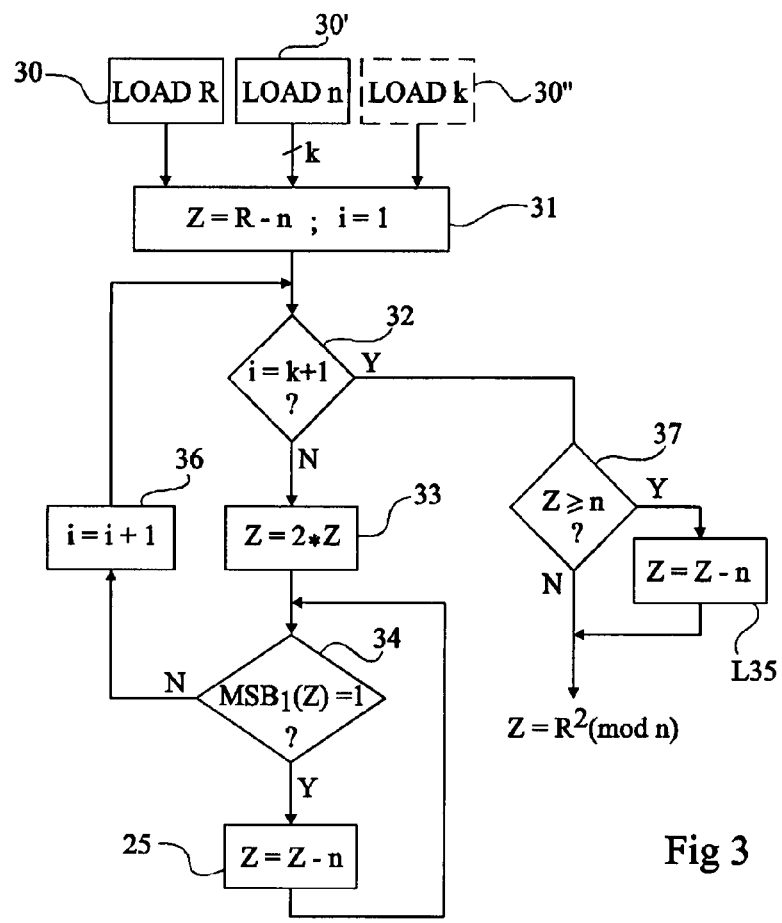
FIG. 3 illustrates a first embodiment of the present disclosure applied to a modular square.

FIG. 3 is a block diagram of a first embodiment of the present disclosure for computing an initial parameter of the type $R^2(\text{mod } n)$. It can be considered as an initialization algorithm of a Montgomery multiplication.

As before, the inputs of the computation are the value R to be squared, the modulus n and the number k of bits required for the binary representation of the modulus. Values R and n are loaded (blocks 30 and 30') from an external input or from a memory into the computation circuit. The number k is either loaded (block 30" in dotted lines) or determined by the processing unit with value n.

In a first step (block 31, i=1; Z=R−n), a variable Z is initialized with value R−n. Then, an iterative loop is implemented for each of the k bits of the binary representation of n. For example (block 32, i=k+1 ?), an index i is initialized with value 1 (block 31) and a loop computation is performed for each bit of n, until the $k^{th}$ bit (included). In each iteration of the loop (output N of test 32), variable Z is first doubled (block 33, Z=2*Z). Such a doubling is achieved by shifting the bits of the variable towards the most significant bit (arbitrarily referred to as the left), the new lowest significant bit being 0.

Then, the most significant bit of variable Z is compared to 1 (block 34, $MSB_1(Z)=1$ ?). While this bit is 1 (output Y of block 34), variable Z is reduced by n (block 35, Z=Z−n). When the MSB of variable Z is 0, the variable Z is comprised in the interval [0, 2n]. Then (output N of block 34), the index i is incremented (block 36, i=i+1) for the next iteration. Once the k iterations have been processed (output Y of block 32), a last check is possibly needed to reduce the result so that it is in the interval [0, n]. Therefore, the variable Z containing the intermediate result is compared to n (block 37, Z>n). If Z is still greater than n (output Y of block 37), a last subtraction is performed (block L35, Z=Z−n) to provide the result $R^2(\text{mod } n)$. If not (output N of block 37), the variable Z directly contains the result $R^2(\text{mod } n)$.

The following is an explanation of how methods according to embodiments of the disclosure work.

It is assumed that R is a power of 2, and more precisely that $R=2^k$ (this condition is not mandatory but simplifies the explanation.

As k is the number of bits required for the binary representation of n:

$$2^{k-1}-1<n<2^k, \text{ and}$$

(multiplying by −1 and adding R):

$$-2^{k-1}+1>-n>-2^k, \text{ and}$$

$$R-2^{k-1}+1>R-n>R-2^k.$$

Since $R=2^k$, it follows that:

$$2^k-2^k<R-n<2^k-2^{k-1}+1, \text{ hence}$$

$$0<R-n<2^{k-1}+1. \quad \text{(Inequality I)}$$

The inequality I above implies that the most significant bit $MSB_1$ of (R−n) is always 0. Considering the first two most significant bits $MSB_2$ of (R−n), that is the bits in positions k+1 and k (equivalent to the powers $2^k$ and $2^{k-1}$), only two situations are possible after the initialization of Z=R−n: Either $MSB_2(Z)=00$ or $MSB_2(Z)=01$.

If $MSB_2(Z)=00$, we can say that:

$$0<Z<2^{k-1}, \quad \text{(Inequality II)}$$

and no reduction step is needed, as $2^{k-1}$ is smaller than n.

If $MSB_2(Z)=01$, we can say that:

$$2^{k-1}-1<Z<2^k$$

Considering the inequality I, it is possible to restrict the admissible interval of Z to:

$$2^{k-1}-1<Z<2^{k-1}+1, \text{ that is: } Z=2^{k-1}.$$

Hence, the case in which $MSB_2(Z)=01$ after the initialization of Z=R−n never occurs, as this would imply that n is a power of 2. But, n is the product of two primes different from 2 or n is a prime, and hence this is not possible.

The valid relation after the initialization of Z is the inequality II ($0<Z<2^{k-1}$).

To compute $R^2 \pmod{n}$ as $[R(\text{mod } n)*R](\text{mod } n)$, embodiments of the present disclosure provide starting with a doubling (shifting to the left) of Z.

Doubling Z gives Z'=2Z. Considering the two most significant bits of Z', the $MSB_1(Z')$ is always 0 as the bit in position k (power $2^{k-1}$) of Z was always 0. Thus, the possible situations are still $MSB_2(Z')=00$ and $MSB_2(Z')=01$.

If $MSB_2(Z')=00$:
$0<Z'<2^{k-1}$ (thus Z'<n), and no reduction step is needed (as in inequality II), because $2^{k-1}$ is smaller than n.

If $MSB_2(Z')=01$:

$$2^{k-1}-1<Z'<2^k.$$

In this situation, it is not clear if Z' is greater or smaller than n. However, it is possible to avoid the reduction step and to accept a partial result in the interval [0, 2n] ($2^k<2n$).

Then, in any case, it holds that:

$$0<Z'<2^k<2n.$$

At this point, the doubling of Z' is processed, as required to compute $[R(\text{mod } n)*R](\text{mod } n)$.

The doubling provides Z"=2Z' and the two most significant bits of Z" can again be examined. This time, there are four possible situations: $MSB_2(Z")=00$, $MSB_2(Z")=01$, $MSB_2(Z")=10$ and $MSB_2(Z")=11$. All these cases are interpreted in the following table:

| $MSB_2(Z")$ | Valid inequalities | Notes |
| --- | --- | --- |
| 00 | $0 < Z" < 2^{k-1} < n$ (II) | No reduction step is needed, as Z" is smaller than n. |
| 01 | $2^{k-1} - 1 < Z" < 2^k$ | It is not clear if Z" is greater of smaller that n. Possibility of avoiding the reduction step, accepting a partial result in the interval [0, 2n]. |
| 10 | $2^k - 1 < Z" < 2^k + 2^{k-1}$ (III) | As $2^k - 1 \geq n$, $n < 2^k < 2n$ and $2^{k-1} < n$, we have: $n < Z" < 3n$. Then it is possible to subtract n from Z", obtaining a partial result in the interval [0, 2n]. |

-continued

| $MSB_2(Z")$ | Valid inequalities | Notes |
|---|---|---|
| 11 | $2^k + 2^{k-1} - 1 < Z" < 2^{k+1}$ | As $2^k - 1 \geq n$, $2^{k-1} < n$ and $2^{k+1} < 4n$, we have: $n < Z" < 4n$. Then it is possible to subtract n from Z", obtaining a partial result in the interval [0, 3n]. As n is represented by k bits, the result after the subtraction will have the two most significant bits equal to 10, and then we fall back into inequality III above. |

In some Montgomery Multiplication methods, it is possible to use one of the inputs not smaller than n, but smaller than 2n. Using this type of Montgomery Multiplication avoids the final comparison 37 (FIG. 3) and possible subtraction L35, and actually leaves the result being not simply smaller than n, but smaller then 2n.

Other alternatives to the Montgomery algorithm lead to the use of values of R that differ from $2^k$. For example R can be $2^{k+3}$ or any other $2^{k+j}$ with j being an integer.

In such cases, the algorithm illustrated by FIG. 3 still works. The only difference is that the iterative loop (on i) is performed 2j more times. Indeed:

$$R^2(\bmod n) = 2^{2k+2j}(\bmod n)$$
$$= 2^{2k+2j}(\bmod n)$$
$$= [2^{2k}(\bmod n) * 2^{2i}](\bmod n).$$

In the above expression, $2^{2k}$ (mod n) represents the output of the algorithm of FIG. 3 with k iterations. Hence, to compute $R^2$ (mod n) with $2^{k+j}$ it is sufficient to add 2j additional iterations.

The algorithm of FIG. 3 (and its alternatives) can also be used to convert an integer X, the value of which is in the interval [0, n] into the Montgomery domain (residual representation) instead of using the Montgomery Multiplication itself. Therefore, Z is initialized (block 31) with X instead of with R−n. As the algorithm of FIG. 3 adds extra loops and a full final comparison, such a conversion is slower than the computation of the Montgomery Multiplication MM(X, R, n) for obtaining the same result. However, the memory space for storing $R^2$ (mod n) is saved as $R^2$ (mod n) is not used.

The bit by bit processing (serial solution) illustrated above can be adapted to a processing word by word (parallel solution), for example each word composed by a number w of bits corresponding to the size (for example, 8, 16, 32 or 64) of other words processed by the circuit.

Figure 4:
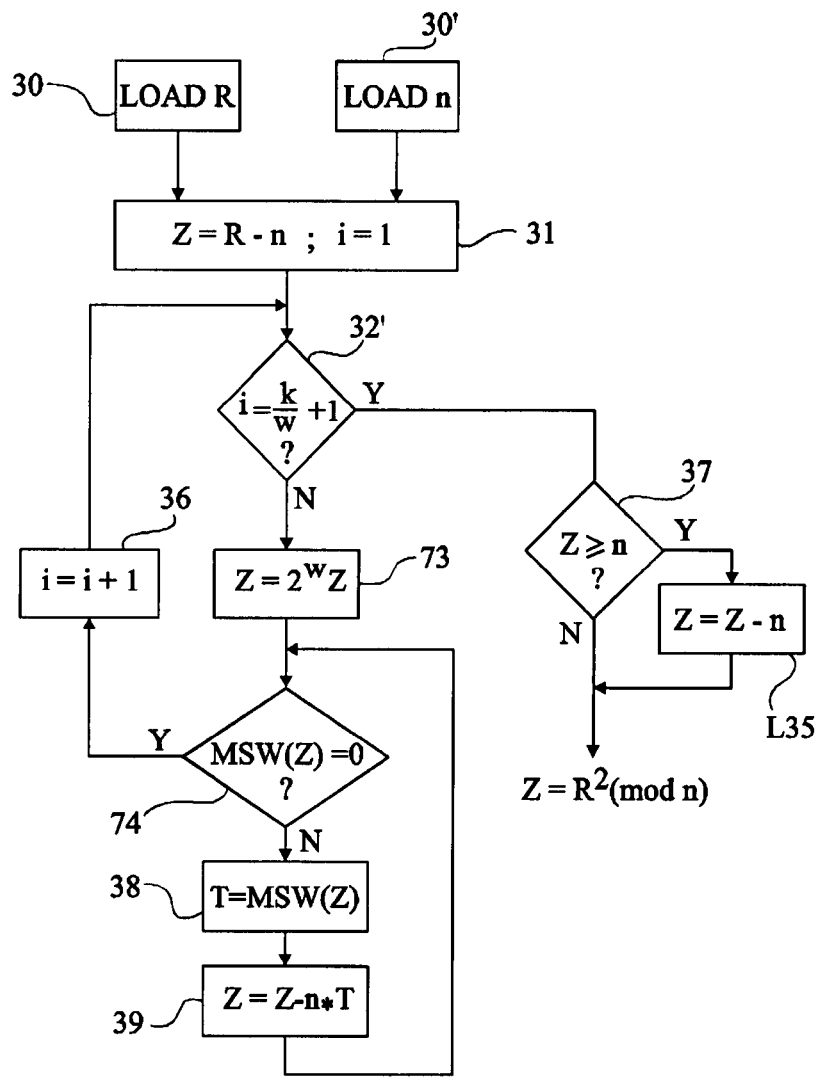
FIG. 4 illustrates an alternative embodiment of the present disclosure applied to a modular square.

FIG. 4 illustrates such a word implementation. In FIG. 4, number k is assumed to be determined or known by the computation unit. The number w of bits per word is also assumed known by the computation unit.

Comparing FIG. 4 to FIG. 3, step 33 changes from a multiplication by 2 (left shift one bit position) to a multiplication (block 73) by $2^w$ (shift left by w bits).

The while loop's condition on the index i of the current bit changes from a bit test (32, FIG. 3) to a word test (block 32, i=k/w+1 ?). Further, the most significant bit is replaced by the most significant word. Hence, while the most significant word of Z is not zero (output N of block 74, MSW(Z)=0 ?), n is subtracted from Z a number of times equal to the value T of the most significant word (blocks 38, T=MSW(Z) and 39, Z=Z−n*T).

In the previous version of FIG. 3, the multiplication (n*T) of block 39 is not present since the word T is just one bit, and if the while loop is executed, then T is equal to 1, and the multiplication is not formally written.

The word version can be further adapted to pre-computations of multiples of n.

Even with the "word" embodiment, the disclosure saves time when compared to the iterative comparison of the whole operand/variable (often several hundreds or thousands of bits). According to embodiments of the disclosure, such a whole comparison is executed only once (block 37).

Figure 5:
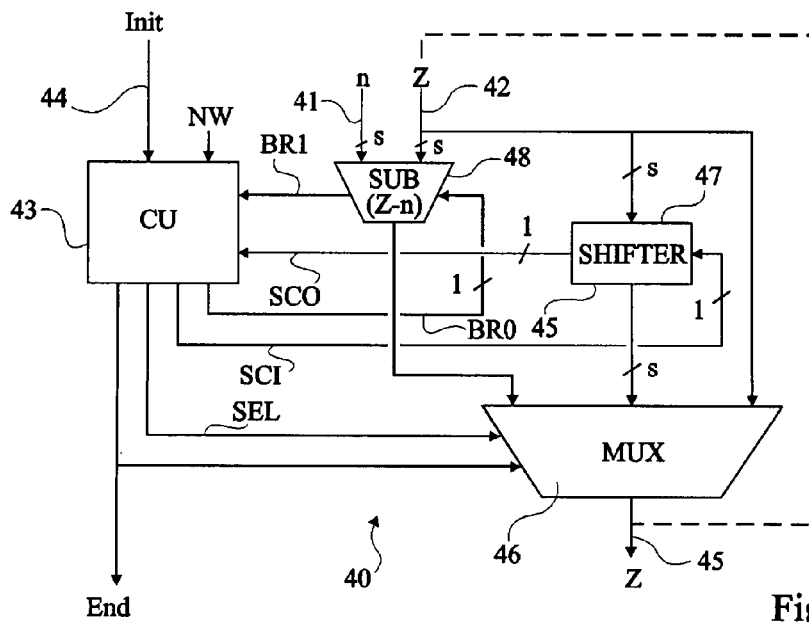
FIG. 5 schematically and partially illustrates a hardware circuit according to an embodiment of the present disclosure.

FIG. 5 schematically and partially represents an embodiment of a circuit architecture 40 for computing the parameter $R^2$(mod n) according to an embodiment of the present disclosure. Having simplified the computation method, an implementation that is at least partially hardware is preferred for time saving purposes.

The architecture 40 has two input ports 41 and 42, respectively receiving the value n and variable Z. Each input port is of s bits, where s is the number of bits of the word managed by the system (for example the CPU 18 of the Set Top Box). An auxiliary input 44 (Init) is used for initializing the architecture and is received by a control unit 43. Architecture 40 has an output port 45 of s bits provided by a multiplexer 46 (MUX).

Figure 1:
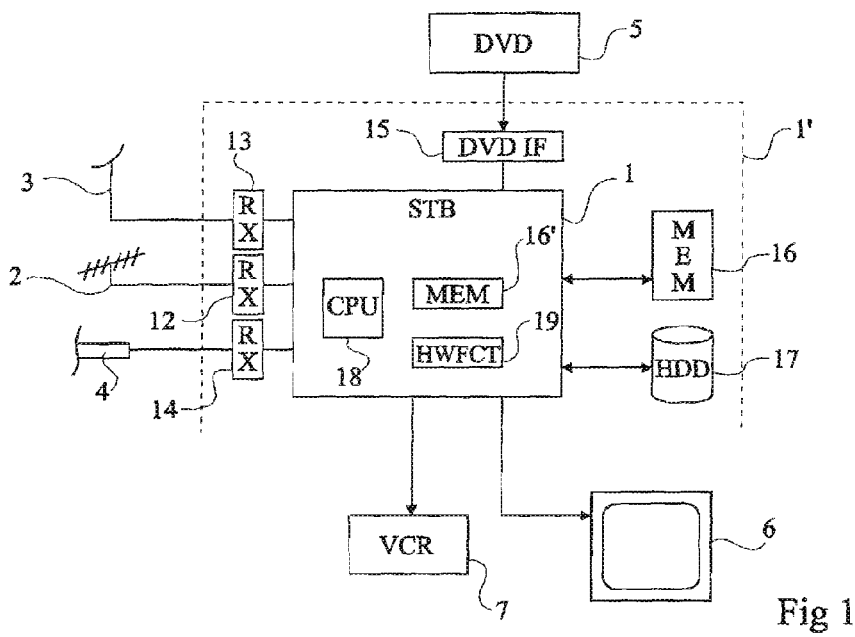
FIG. 1 (already described) illustrates in schematic form a Set Top Box system to which embodiments of the present disclosure can be applied.

In the embodiment of FIG. 5, the central processing unit (for example 18, FIG. 1) initially has to compute Z=R−n, and then stores in memory (for example, in registers 16') the temporary value Z and the value n. The only tasks that the central processing unit has to execute/manage are sending Z and n to the dedicated hardware and storing the updated value of Z.

As explained above, the two functional units required for computing the modular reduction are a shifter 47 and a subtraction unit 48 (SUB).

The inputs Z and n are sent to the dedicated unit. Internally, input Z is sent to the shifter 47 and to the subtractor 48, while input n is sent only to the subtractor.

Figure 5A:
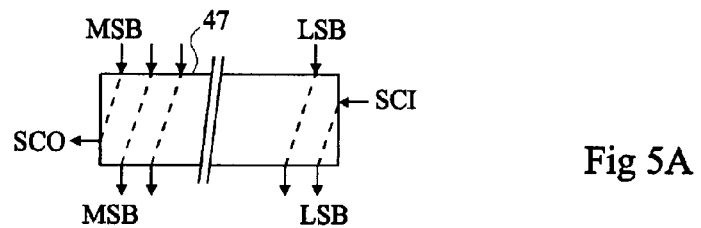
FIG. 5A illustrates a part of the circuit of FIG. 4 in more detail.

FIG. 5A illustrates the shifter unit 47. The shifter 47 has s+1 inputs for receiving the s bits of value Z and a shift carry SCI coming from the unit 43. The shifter has s+1 outputs delivering s bits to the multiplexer 46 and a shift carry output SCO delivering the most significant bit MSB of the input word to the control unit 43. The least significant bit LSB of the output word corresponds to the shift carry input SCI.

Taking two inputs n and Z of s bits and one input of one bit BR0 provided by the control unit 43, the subtractor 48 generates an output of s bits to the multiplexer 46 representing Z−n−BR0 and an output of one bit BR1 representing the carry. The bit BR1 is equal to one when Z is smaller than n+BR0.

The control unit 43 receives (for example from the CPU) the number of words NW that the data is composed of, an input bit Init that indicates that the input word Z is the first word of the data, and the two output bits SCO and BR1 from the shifter 47 and the subtraction unit 48. The unit 43 generates three outputs, a signal End that indicates the reduction is finished, the two respective carries SCI and BR0 for the shifter 47 and for the subtraction unit 48, and a signal SEL for the multiplexer indicating whether the output 45 should be taken from the shifter 47 or from the subtraction unit 48. Based on the previous operation, the control unit 43 knows if a subtraction or a shift has to be performed. The signal finish is also provided to the multiplexer 46 to directly select input 42 (i.e. the content of the register storing the intermediate result).

Figure 6:
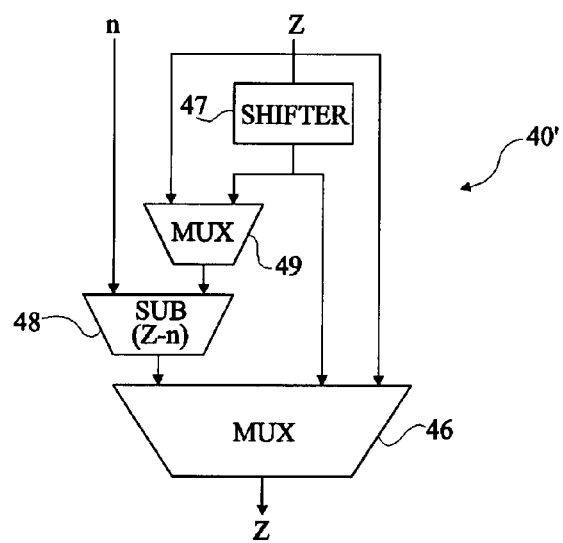
FIG. 6 partially illustrates an alternative of the embodiment of FIG. 5.

FIG. 6 illustrates an alternative circuit architecture 40' in which the components are coupled in a different way in order to compute in a single clock cycle both the shifting of Z and the subtraction of n. Only the data-path of the architecture is shown. The value Z or the value 2Z can be selected as the input of the subtraction unit 48 through a multiplexer 49 receiving the value Z and the output of the shifter 47. In this way, based on the previous computation, it is possible to compute Z−n or 2Z−n. This allows saving the time necessary for computing first the multiplication by two and then the subtraction. The control unit 43 has of course to be adapted.

According to another alternative, the order of the computation is changed such that subtraction is performed first, followed by the shifting operation.

Loading the number of words NW in the control unit 43 can be avoided for systems dedicated to computing predefined sizes of data. It is possible to specify a small number of lengths within the control unit 43, avoiding the necessity of loading the length of the data, and thus saving space and time in the hardware implementation. For example, systems dedicated for computing RSA 1024 (bits) or RSA 2048 (bits), or both, can benefit from such an alternative.

The first initialization of Z=R−n can also be computed with a modification of the control unit 43 to use the architecture 40.

In those systems in which the central processing unit can interface with only one port, the architecture 40 can be changed in order to receive first Z, or n, and then the second operand. This requires a simple buffer for storing the first operand.

Figure 7:
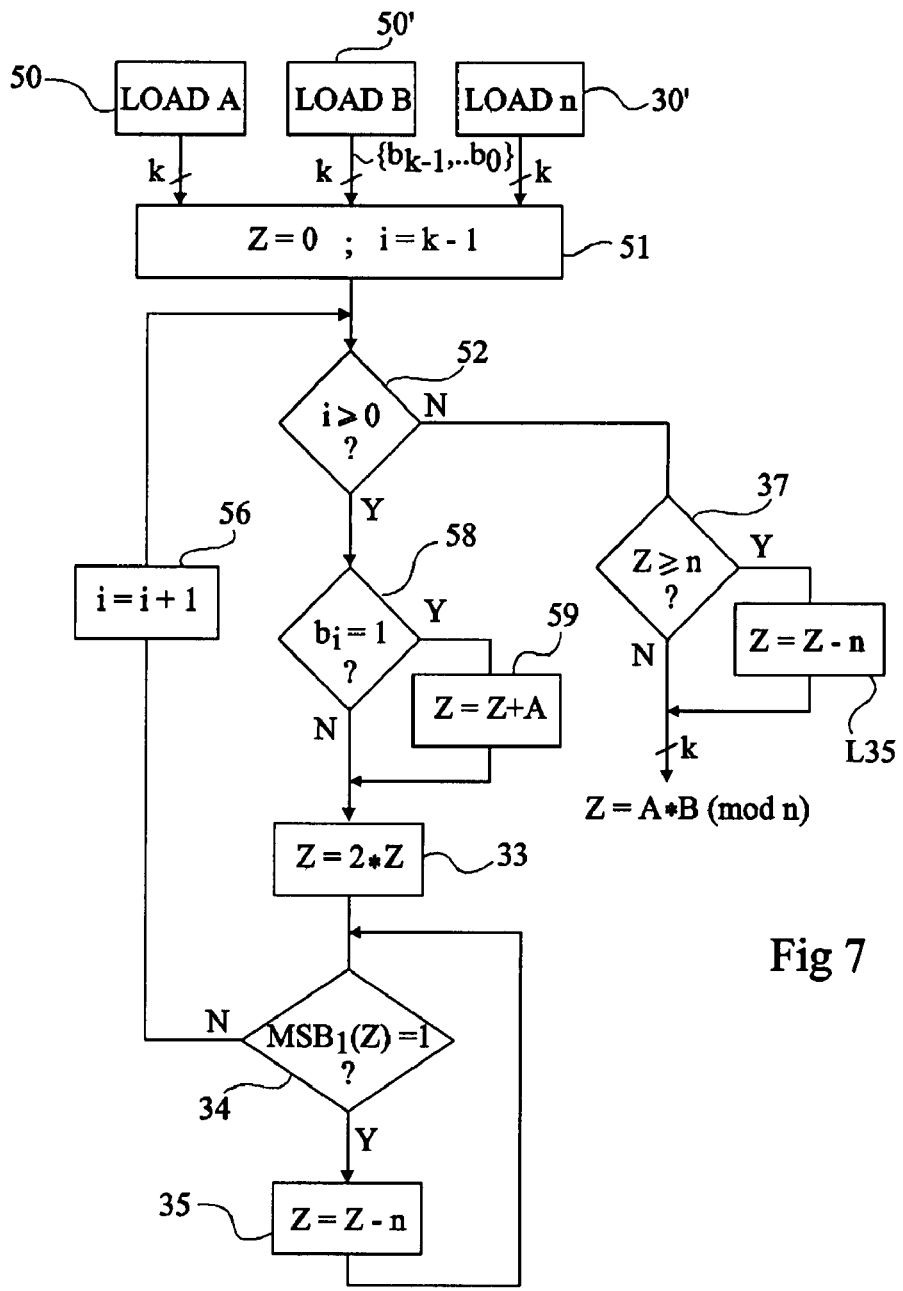
FIG. 7 illustrates an embodiment of the present disclosure applied to a modular multiplication.

FIG. 7 illustrates an embodiment of the present disclosure for computing a modular multiplication.

The inputs (blocks 50, 50' and 30') are two operands A and B, both of a maximum k bits, and the modulus n to be loaded in the circuit, the bits of operand B being hereafter designated $b_{k-1}, \ldots, b_0$.

A first step (block 51) is an initialization of a bit index i with k−1 and (optionally) of an intermediate result Z with 0.

Then, an iterative loop is implemented for each of the k bits of operand B. For example (block 52, i≧0 ?), a test is performed on the value of the index i until the $k^{th}$ bit (included) has been processed (in a reverse order). In each iteration of the loop (output Y of test 52), a test is performed on the value (0 or 1) of the current bit of the operand B (block 58, $b_i$=1). If the current bit is one (output Y of block 58), the operand A is add to the intermediate result (block 59, Z=Z+A). If not (output N of block 58), the intermediate result is not modified with operand A.

Next, variable Z is doubled (block 33, Z=2*Z).

Next, while the most significant bit of variable Z is 1 (output Y of block 34, $MSB_1(Z)$=1 ?), variable Z is reduced by n (block 35, Z=Z−n). When the MSB of variable Z is 0 (output N of block 34), the index i is decremented (block 56, i=i−1) for the next iteration. When the k iterations have been processed (output N of block 32), the last check of block 37 is possibly performed to reduce (block L35) the result to the interval [0, n]. The variable Z finally contains the result A*B (mod n).

Figure 8:
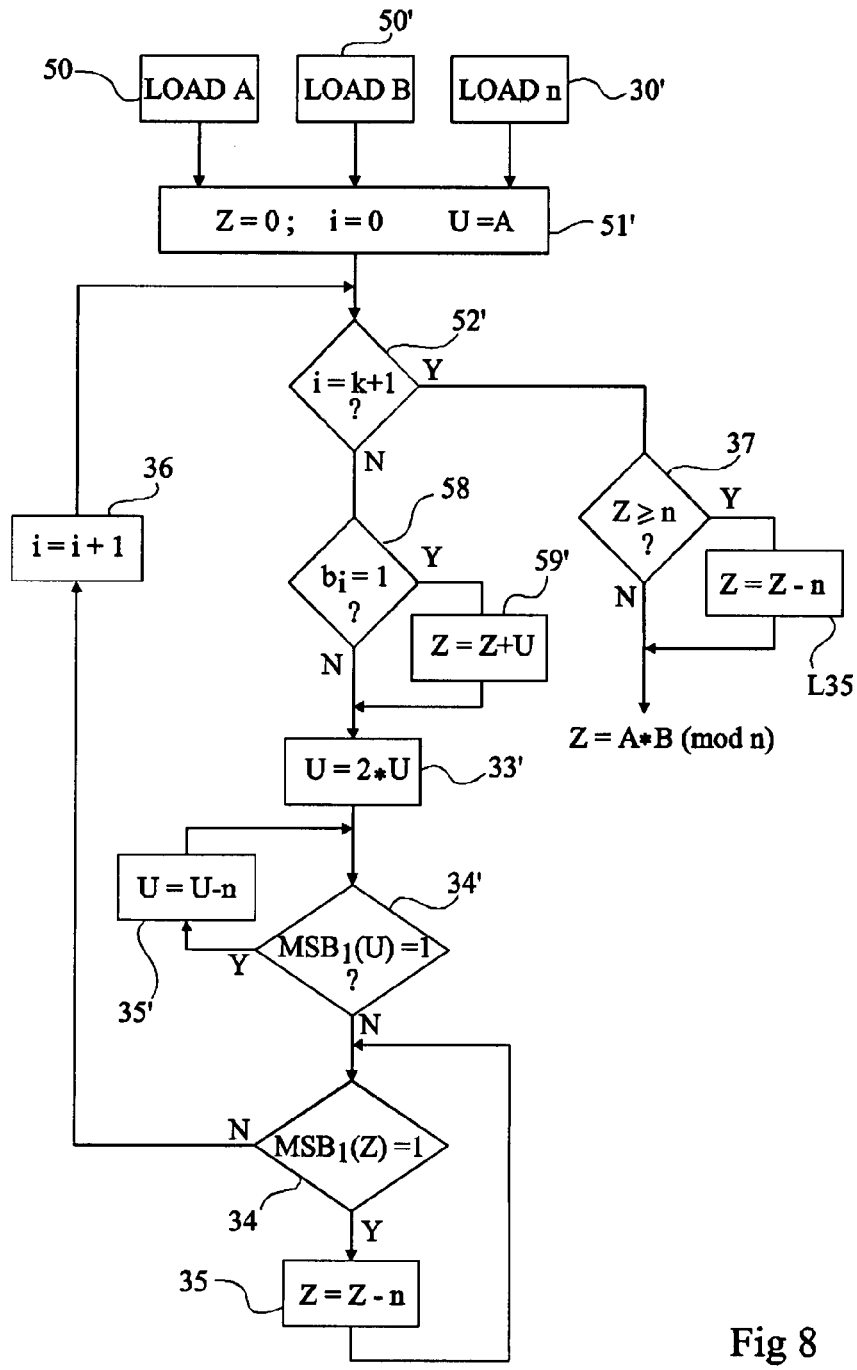
FIG. 8 illustrates an alternative embodiment of the present disclosure applied to a modular multiplication.

FIG. 8 illustrates an alternative embodiment for computing a modular multiplication.

With respect to the FIG. 7, a first difference of the embodiment of FIG. 8 is the direction of the bit iteration. The index is initialized to 0 (block 51'), the test 52 is replaced by a test of the maximum value of the index (block 52', i=k+1 ?) and the decrement 56 is replaced by an increment (block 36). A second difference is that the doubling applies (block 33', U=2*U) to a second intermediate result U initialized (block 51') with the value of the operand A and, result U being used instead of A for updating (block 59', Z=Z+U) the variable Z. A third difference is an additional loop performed on the most significant bit of the variable U. After the doubling operation, while the most significant bit of variable U is 1 (output Y of block 34', $MSB_1(U)$=1 ?), variable U is reduced by n (block 35', U=U−n). When the MSB of variable U is 0 (output N of block 34'), the loop of FIG. 7 starts on the MSB of variable Z.

Figure 9:
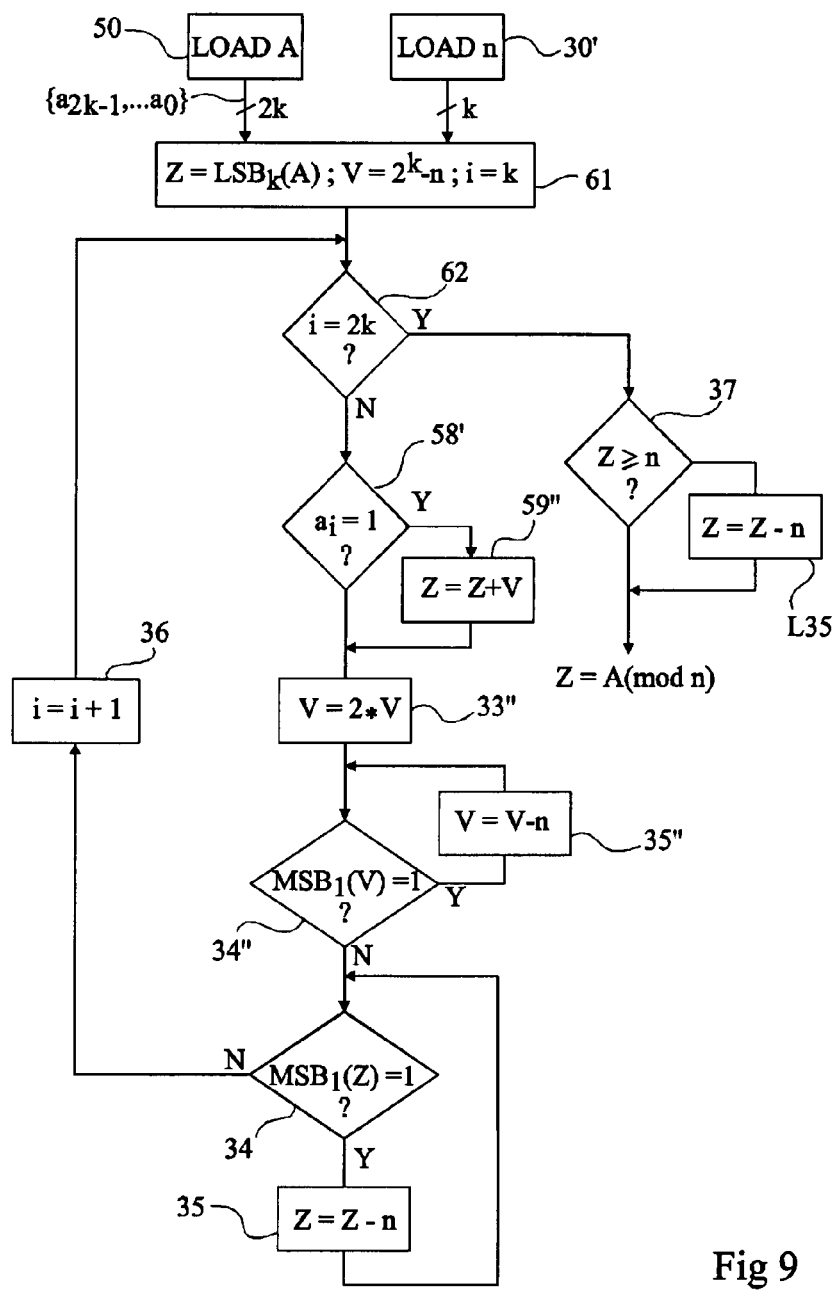
FIG. 9 illustrates an embodiment of the present disclosure applied to a modular reduction.

FIG. 9 illustrates an embodiment of the present disclosure, applied to a modular reduction.

The inputs (blocks 50 and 30') are an operand A of a maximum 2k bits and the modulus n, the bits of operand A being hereafter designated $a_{2k-1}, \ldots, a_0$.

A first step (block 61) is an initialization of a bit index i with k−1, of a first variable Z (containing at the end the result) with the k lowest significant bits of the operand A (Z=$LSB_k(A)$) and of a second variable V with the value $2^k$−n.

Then, an iterative loop is implemented for each of the k most significant bits. For example (block 62, i=2k ?), a test is made on the value of the index i until the $2k^{th}$ index (included) has been processed. In each iteration of the loop (output N of test 62), a test is made on the value (0 or 1) of the current bit of the operand A (block 58', $a_i$=1). If the current bit is one (output Y of block 58'), the intermediate result is updated by adding variable V (block 59", Z=Z+V). If not (output N of block 58'), the intermediate result is not modified.

Next, variable V is doubled (block 33", V=2*V).

Next, while the most significant bit of variable V is 1 (output Y of block 34", $MSB_1(V)$=1 ?), variable V is reduced by n (block 35", V=V−n). When the MSB of variable V is 0 (output N of block 34"), a second loop is executed with variable Z (blocks 34 and 35). When the MSB of variable Z is 0 (output N of block 34), the index i is incremented (block 36) for the next iteration. Once the 2k iterations have been processed (output Y of block 62), a last check of block 37 is preformed to possibly reduce (block L35) the result to the interval [0, n]. The variable Z finally contains the result A (mod n).

The fact that the algorithms of FIGS. 7 to 9 provide the expected results can be deduced from the detailed explanation made above in connection with FIG. 3.

The embodiments of FIGS. 7 to 9 have been described in connection with a bit by bit computation. However, the same alternative to a word by word implementation derivable from FIG. 4 is possible.

The computation core to be used for implementing the methods of FIGS. 7 to 9 and their alternatives is based on the same elements and functionalities as those of architecture 40, 40' and their alternatives disclosed in connection with FIGS. 5, 5A and 6.

An advantage of embodiments of the present disclosure is the saving of time for computing a modular operation by reducing to only one the number of comparisons of big numbers. This technical advantage is very important in cryptographic processing units.

Another advantage of embodiments of the disclosure is that the computation core (which can be made in wired logic) of the modular operation is then reduced in size. The fact that only one whole comparison is needed allows the central processing unit of the system to be used to perform this computation even if it takes longer than a computation by a wired logic circuit. Such a solution was previously impossible due to the number of comparisons.

Embodiments of the present disclosure can be utilized in a variety of different types of electronic devices, such as set top boxes, computer systems, portable devices like portable audio and/or video players, and so on.

Having thus described at least one illustrative embodiment of the disclosure, various alterations, modifications and improvements will readily occur to those skilled in the art.

Such alterations, modifications and improvements are intended to be within the scope of the disclosure. Accordingly, the foregoing description is by way of example only and is not intended to be limiting. Further, the practical hardware and/or software implementation of the present disclosure is in the ability of one with an ordinary skill in the art from the above functional description, especially the integration of the disclosure in a processing unit. The disclosure is limited only as defined in the following claims and equivalents thereto.

The invention claimed is:

1. A computing method performed by an electronic circuit for computing a modular reduction operation of at least one operand by a modulus, the method comprising:
   in a subtraction circuit, generating a first intermediate result representing a first intermediate result initialized with a value representing two to the power of k reduced by the modulus, where k designates the number of bits representing the modulus;
   generating a second intermediate result with the k lowest significant bits of said operand, at least comprising iteratively for each bit of said operand;
   in an addition circuit, if the state of the current bit of said operand is one, updating the second intermediate result by adding in the first intermediate result;
   in a shifting circuit, doubling the value of a first intermediate result by shifting the bits of the first intermediate result towards the most significant bit, where the most significant bit is the k+1th bit;
   in the subtraction circuit, while the most significant bit of the first intermediate result is one, updating the first intermediate result by subtracting the modulus;
   in the subtraction circuit, and while the most significant bit of the second intermediate result is one, updating the second intermediate result by subtracting the modulus; and
   in the subtraction circuit, generating an output of the modular reduction operation by updating the second intermediate result by subtracting the modulus if the second intermediate result is greater than the modulus.

2. An integrated circuit having a modular operation comprising a computation core receiving a first value and a second value representing the modulus, and providing an updated first value, said core comprising:
   the shifting circuit;
   the subtraction circuit; and
   a control unit to perform the iterative steps of the computation according to the method of claim 1.

3. The circuit of claim 2, integrated in a processing unit of cryptographic algorithms.

4. A Set Top Box comprising a circuit according to claim 2.

5. A circuit, comprising:
   a subtraction circuit configured to generate a first intermediate result initialized with a value representing two to the power of k reduced by a modulus, where k designates the number of bits representing the modulus, the subtraction circuit further configured to generate a second intermediate result with the k lowest significant bits of an operand, at least comprising iteratively for each bit of the operand;
   an addition circuit configured to update the second intermediate result by adding in the first intermediate result if the state of the current bit of the operand is one;
   a shifting circuit configured to double the value of a first intermediate result by shifting the bits of the first intermediate result towards the most significant bit, where the most significant bit is the k+1th bit;
   such that the subtraction circuit, while the most significant bit of the first intermediate result is one, is configured to update the first intermediate result by subtracting the modulus, and while the most significant bit of the second intermediate result is one, configured to update the second intermediate result by subtracting the modulus;
   the subtraction circuit further configured to generate an output of the modular reduction operation by updating the second intermediate result by subtracting the modulus if the second intermediate result is greater than the modulus; and
   a control circuit coupled to the subtraction, addition, and shifting, circuits and operable to the control the operation of these circuits.

6. The circuit of claim 5 wherein the control circuit controls the subtraction, addition, and shifting, circuits to utilize the output to encrypt data words.

7. An electronic system, comprising;
   electronic circuitry operable to perform a desired function; and
   an encryption/decryption circuit coupled to the electronic circuitry, the encryption/decryption circuit including,
   a subtraction circuit configured to generate a first intermediate result initialized with a value representing two to the power of k reduced by a modulus, where k designates the number of bits representing the modulus, the subtraction circuit further configured to generate a second intermediate result with the k lowest significant bits of an operand, at least comprising iteratively for each bit of the operand;
   an addition circuit configured to update the second intermediate result by adding in the first intermediate result if the state of the current bit of the operand is one;
   a shifting circuit configured to double the value of a first intermediate result by shifting the bits of the first intermediate result towards the most significant bit, where the most significant bit is the k+1th bit;
   such that the subtraction circuit, while the most significant bit of the first intermediate result is one, is configured to update the first intermediate result by subtracting the modulus, and while the most significant bit of the second intermediate result is one, configured to update the second intermediate result by subtracting the modulus;
   the subtraction circuit further configured to generate an output of the modular reduction operation by updating the second intermediate result by subtracting the modulus if the second intermediate result is greater than the modulus; and
   a control circuit coupled to the subtraction, addition, and shifting, circuits and operable to the control the operation of these circuits.

8. The electronic system of claim 7 wherein the electronic circuitry comprises one of set top box, computer, portable audio player, and video player circuitry.

9. The method of claim 1, further comprising updating the second intermediate result again by subtracting the modulus if the current value of the second intermediate result is greater than the value of the modulus.

10. The method of 1 wherein a control circuit controls the subtraction, addition, and shifting, circuits to utilize the output to decrypt data words.

* * * * *

UNITED STATES PATENT AND TRADEMARK OFFICE
CERTIFICATE OF CORRECTION

| | | |
|---|---|---|
| PATENT NO. | : 8,117,251 B2 | |
| APPLICATION NO. | : 11/786767 | |
| DATED | : February 14, 2012 | |
| INVENTOR(S) | : Guido Marco Bertoni et al. | |

It is certified that error appears in the above-identified patent and that said Letters Patent is hereby corrected as shown below:

- In Claim 10, Column 12, Line 61 of the patent, please change the text "The method of 1 wherein a control circuit controls the" to --The method of claim 1 wherein a control circuit controls the--.

Signed and Sealed this
Twenty-fourth Day of April, 2012

David J. Kappos
*Director of the United States Patent and Trademark Office*